US011415001B1

(12) United States Patent
Leary et al.

(10) Patent No.: US 11,415,001 B1
(45) Date of Patent: Aug. 16, 2022

(54) COOLING HOLE FILTER CONFIGURATION

(71) Applicant: General Electric Company, Schenectady, NY (US)

(72) Inventors: Brendan James Leary, Simpsonville, SC (US); Frederic Woodrow Roberts, Jr., Simpsonville, SC (US); Tyler Christopher Henson, Greenville, SC (US)

(73) Assignee: General Electric Company, Schenectady, NY (US)

(*) Notice: Subject to any disclaimer, the term of this patent is extended or adjusted under 35 U.S.C. 154(b) by 44 days.

(21) Appl. No.: 17/198,839

(22) Filed: Mar. 11, 2021

(51) Int. Cl.
*F01D 5/18* (2006.01)
*B33Y 80/00* (2015.01)

(52) U.S. Cl.
CPC .............. *F01D 5/187* (2013.01); *B33Y 80/00* (2014.12); *F05D 2250/11* (2013.01); *F05D 2250/141* (2013.01); *F05D 2260/201* (2013.01); *F05D 2260/607* (2013.01)

(58) Field of Classification Search
CPC ..... F01D 5/186; F01D 5/187; F05D 2260/607
See application file for complete search history.

(56) References Cited

U.S. PATENT DOCUMENTS

| 4,192,138 | A | * | 3/1980 | Szema | F23R 3/045 |
| | | | | | 431/351 |
| 7,052,233 | B2 | * | 5/2006 | Fried | F01D 25/12 |
| | | | | | 415/121.2 |
| 10,427,075 | B2 | * | 10/2019 | Jennings | F02C 7/055 |
| 10,577,954 | B2 | | 3/2020 | Kington et al. | |
| 10,584,613 | B2 | * | 3/2020 | Stevens | F02C 6/08 |
| 2003/0021685 | A1 | * | 1/2003 | Fried | F01D 5/18 |
| | | | | | 416/95 |
| 2007/0048122 | A1 | * | 3/2007 | Van Suetendael | B01D 46/40 |
| | | | | | 415/115 |
| 2020/0378305 | A1 | * | 12/2020 | Dudebout | F23R 3/06 |

* cited by examiner

*Primary Examiner* — Eldon T Brockman
(74) *Attorney, Agent, or Firm* — Charlotte Wilson; Hoffman Warnick LLC

(57) ABSTRACT

A gas turbine component includes a turbine component having an outer wall and an internal cooling passage; a cooling air supply hole through the outer wall in fluid communication with the internal cooling passage; and a filter mound disposed over the cooling air supply hole. The filter mound includes a filter mound wall projecting from the turbine component and defining an interior of the filter mound. At least one hole in the filter mound wall extending through the filter mound wall is configured to permit cooling air supply to pass therethrough while blocking debris from passing through the interior of the filter mound and clogging the cooling air supply hole in fluid communication with the internal cooling passage. The turbine component and the filter mound are formed during manufacturing of the turbine component.

20 Claims, 10 Drawing Sheets

COOLING HOLE FILTER CONFIGURATION

TECHNICAL FIELD

The disclosure relates generally to cooling hole configurations for gas turbine components. In particular, the disclosure relates to cooling hole formations in arrangements of clustered holes for gas turbine components that facilitate cooling air filtration and that can be formed using additive manufacturing techniques.

BACKGROUND

In gas turbines, components exposed to hot gases often include complex arrangements of small cooling holes. Effective cooling of such hot gas path components is important to continue operation of the gas turbine at the elevated temperatures produced by high-efficiency gas turbines for generating desired output. Debris entering into cooling passages of such turbine components can interrupt cooling of the turbine components. Filters for cooling air supplies have been used to provide continued operation without necessitating outages for maintenance and clearing of the cooling paths, which can be especially time-consuming for cooling arrangements with a large number of cooling holes.

The pace of change and improvement in the realms of power generation, aviation, and other fields has accompanied extensive research into manufacturing components used in these fields. Conventional manufacture of metallic, plastic or ceramic composite components generally includes milling or cutting away regions from a slab of material before treating and modifying the cut material to yield a part, which may have been simulated using computer models, e.g., in drafting software. Manufactured components, which may be formed from metal, can include, e.g., airfoil components for installation in a turbomachine such as an aircraft engine or power generation system.

Additive manufacturing (AM) includes a wide variety of processes of producing an object through the successive layering of material rather than the removal of material. Additive manufacturing can create complex geometries without the use of any sort of tools, molds or fixtures, and with little or no waste material. Instead of machining objects from solid billets of material, much of which is cut away and discarded, the only material used in additive manufacturing is what is required to shape the object. Current categories of additive manufacturing may include binder jetting, material extrusion, powder bed infusion, directed energy deposition, sheet lamination and vat photopolymerization.

Additive manufacturing techniques typically include taking a three-dimensional (3D) computer aided design (CAD) file of the object to be formed and electronically slicing the object into layers (e.g., 18-102 micrometers thick) to create a file with a two-dimensional image of each layer (including vectors, images or coordinates) that can be used to manufacture the object. The 3D CAD file can be created in any known fashion, e.g., computer aided design (CAD) system, a 3D scanner, or digital photography and photogrammetry software. The 3D CAD file may undergo any necessary repair to address errors (e.g., holes, etc.) therein, and may have any CAD format such as a Standard Tessellation Language (STL) file.

The 3D CAD file may then be processed by a preparation software system (sometimes referred to as a "slicer") that interprets the 3D CAD file and electronically slices it such that the object can be built by different types of additive manufacturing systems. The preparation software system may be part of the CAD system, part of the AM system, or separate from the CAD system and the AM system. Where separate, the preparation software system may output an object code file in any format capable of being used by the desired AM system. For example, the object code file may be an STL file or an additive manufacturing file (AMF), the latter of which is an international standard that is an extensible markup-language (XML) based format designed to allow any CAD software to describe the shape and composition of any three-dimensional object to be fabricated on any AM printer. Depending on the type of additive manufacturing used, material layers are selectively dispensed, sintered, formed, deposited, etc., to create the object per the object code file.

One form of powder bed infusion (referred to herein as metal powder additive manufacturing) may include direct metal laser melting (DMLM) (also referred to as selective laser melting (SLM)). In metal powder additive manufacturing, metal powder layers are sequentially melted together to form the object. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The process takes place in a processing chamber having a precisely controlled atmosphere.

To create each two-dimensional layer of the object geometry, a high-powered irradiation beam, such as a 100-Watt ytterbium laser, moves or is deflected in the X-Y direction and selectively welds (melts) the metal powder to fuse the metal powder and form a solid metal. The metal powder bed, which is moveable in a vertical (Z) direction, may be lowered for each subsequent two-dimensional layer, and the process repeats until the object is completely formed.

BRIEF DESCRIPTION

All aspects, examples, and features mentioned below can be combined in any technically possible way.

An aspect of the disclosure provides a gas turbine component that includes a turbine component having an outer wall and an internal cooling passage; a cooling air supply hole through the outer wall in fluid communication with the internal cooling passage; and a filter mound disposed over the cooling air supply hole. The filter mound includes a filter mound wall spaced from the turbine component and defining an interior of the filter mound. At least one hole in the filter mound wall extending through the filter mound wall is configured for permitting cooling air supply to pass therethrough while blocking debris from passing through the interior of the filter mound and clogging the cooling air supply hole leading to the internal cooling passage. The turbine component and filter mound are formed during manufacturing of the turbine component.

Another aspect of the disclosure includes any of the preceding aspects, and wherein the filter mound wall includes a raised rounded protrusion.

A further aspect of the disclosure includes any of the preceding aspects, and wherein the raised rounded protrusion defines a circular periphery and the interior being defined as a semi-circular interior.

A still further aspect of the disclosure includes any of the preceding aspects, wherein the at least one hole includes a plurality of holes.

Another further aspect of the disclosure includes any of the preceding aspects, wherein the at least one hole is a plurality of holes that is regularly spaced about the filter mound.

Yet another aspect of the disclosure includes any of the preceding aspects, wherein the at least one hole is a plurality of holes that is irregularly spaced about the filter mound.

Still another aspect of the disclosure includes any of the preceding aspects, wherein the at least one hole is a plurality of holes that is randomly spaced about the filter mound.

Another aspect of the disclosure includes any of the preceding aspects, wherein the turbine component and the filter mound are integrally formed during additive manufacturing of the turbine component.

In another aspect of the disclosure, which includes any of the preceding aspects, additional blockage structure is provided in the interior of the filter mound, the additional blockage structure in the interior of the filter mound being configured for at least one of blocking debris that may pass through the at least one hole and breaking up or fracturing debris that enters through the at least one hole.

Another certain aspect of the disclosure includes any of the preceding aspects, wherein the additional blockage structure in the interior of the filter mound includes at least one pedestal on the outer wall of turbine component.

Another aspect of the disclosure includes any of the preceding aspects, wherein the at least one pedestal includes a plurality of pedestals in the interior of the filter mound.

In yet another aspect of the disclosure, which includes any of the preceding aspects, the additional blockage structure in the interior of the filter mound includes at least one circumferential raised ring on the outer wall of turbine component.

In another further aspect of the disclosure, which includes any of the preceding aspects, the at least one circumferential raised ring surrounds the cooling air supply hole.

Another aspect of the disclosure includes any of the preceding aspects, wherein the additional blockage structure in the interior of the filter mound includes an extruded hole extending from the cooling air supply hole on the outer wall of turbine component.

An aspect of the disclosure provides a filter for a cooling air supply hole in a gas turbine component. The gas turbine component includes an outer wall, an internal cooling passage, and a cooling air supply hole through the outer wall in fluid communication with the internal cooling passage. The filter comprises a filter mound disposed over the cooling air supply hole; wherein the filter mound includes a raised rounded protrusion, a filter mound wall spaced from the turbine component and defining an interior of the filter mound, at least one hole in the filter mound wall extending through the filter mound wall configured for permitting cooling air supply to pass therethrough while blocking debris from passing through the interior of the filter mound and clogging the cooling air supply hole. The turbine component and filter mound are formed during manufacturing of the turbine component.

Another aspect of the disclosure includes any of the preceding aspects, wherein the at least one hole includes a plurality of holes.

Another further aspect of the disclosure includes any of the preceding aspects, wherein the plurality of holes is at least one of regularly spaced about the filter mound; irregularly spaced about the filter mound; and randomly spaced about the filter mound.

In another aspect of the disclosure, which includes any of the preceding aspects, the turbine component and the filter mound are integrally formed during additive manufacturing of the turbine component.

Another aspect of the disclosure includes any of the preceding aspects, further including additional blockage structure in the interior of the filter mound, the additional blockage structure in the interior of the filter mound being configured for at least one of blocking debris that may pass through the at least one hole and breaking up or fracturing debris that enters through the at least one hole.

In yet another aspect of the disclosure, which includes any of the preceding aspects, the additional blockage structure in the interior of the filter mound includes at least one of at least one pedestal on the outer wall of turbine component; at least one raised circumferential mound on the outer wall of turbine component; and an extruded hole extending from the cooling air supply hole on the outer wall of turbine component.

Two or more aspects described in this disclosure, including those described in this summary section, may be combined to form implementations not specifically described herein.

The details of one or more implementations are set forth in the accompanying drawings and the description below. Other features, objects, and advantages will be apparent from the description and drawings and from the claims.

The illustrative aspects of the present disclosure are designed to solve the problems herein described and/or may solve other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
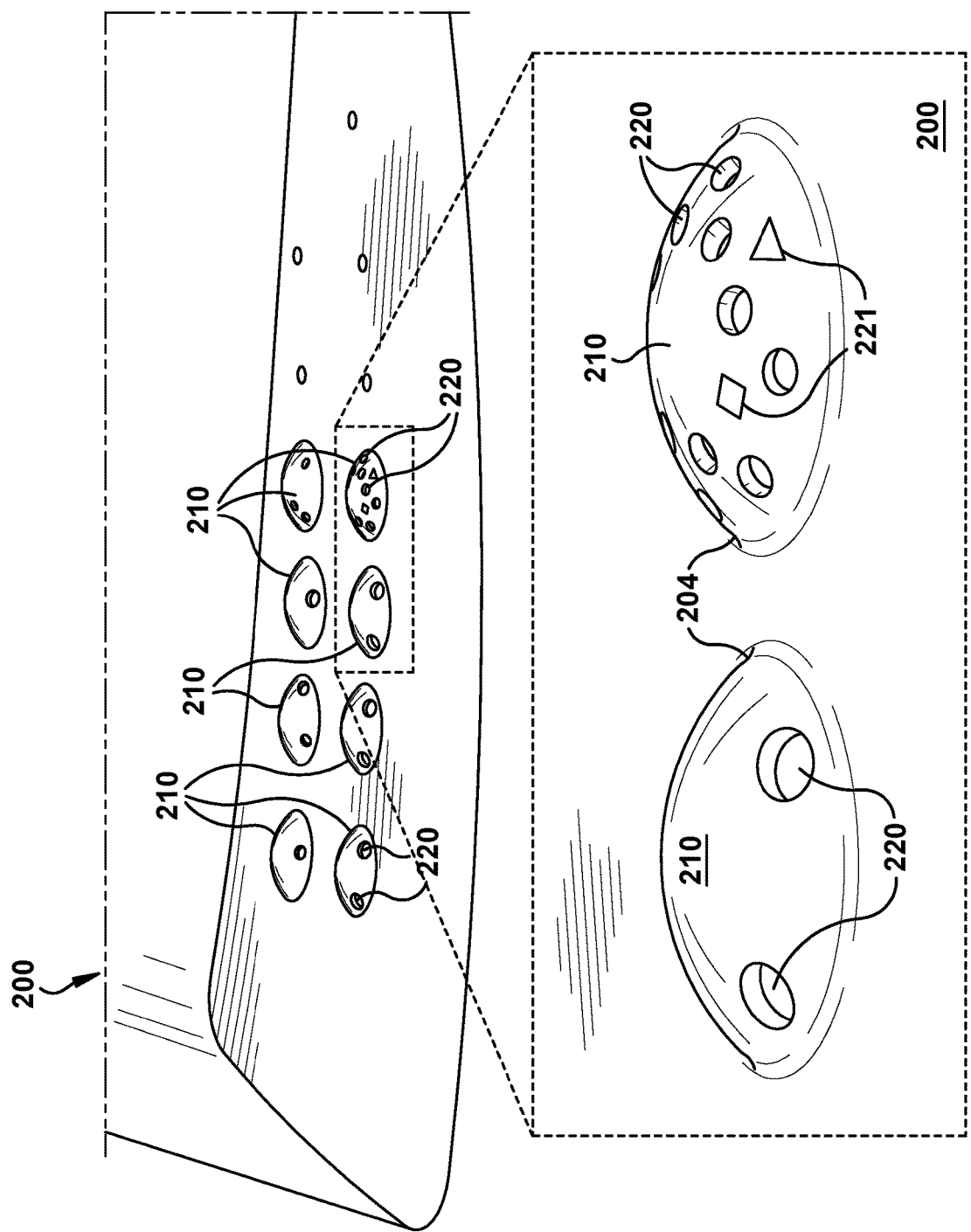
FIG. 1 illustrates a turbine component with a filter mound according to aspects embodied by the disclosure.

It is noted that the drawings of the disclosure are not necessarily to scale. The drawings are intended to depict only typical aspects of the present subject matter and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbine airfoil. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow (i.e., the direction from which the flow originates).

The terms "forward" and "aft," without any further specificity, refer to directions, with "forward" referring to the front or compressor end of the turbine engine or turbomachine, and "aft" referring to the rearward section of the turbine engine or turbomachine.

It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine engine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a filter mound 210 that covers a cooling air supply hole 205 to a cooling passage 206 (FIG. 2) of a turbine component 200. As embodied by the disclosure, turbine component 200 can include hot gas path components, including, but not limited to, airfoils, combustion liners, end caps, fuel nozzle assemblies, crossfire tubes, transition pieces, turbine nozzles, turbine stationary shrouds, and turbine blades (also referred to as turbine buckets), or any other hot gas path part now known or hereinafter developed. Although FIG. 1 illustrates a truncated airfoil, the configuration of the hot gas path part is merely demonstrative and not intended to limit the embodiments in any manner.

As illustrated in FIGS. 1-6 and 10, filter mound 210 can be defined by a wall 217 formed with turbine component 200 at a turbine component cooling air supply hole 205. In a further aspect of the embodiments, filter mound(s) 210, as embodied by the disclosure, may be provided proximate impingement cooling hole(s) on an impingement insert 150 (FIG. 6) that is configured to be disposed in the turbine component 200. The impingement insert 150 is configured to enable cooling air flow into internal cooling passages of the turbine component 200. As noted above, turbine component 200 can include hot gas path components now known or hereinafter developed. In this configuration, cooling flow proceeds through holes 220 into an interior 211 of filter mound 210, around any blockage structures in interior 211, and into a respective cooling air supply hole 205.

Figure 6:
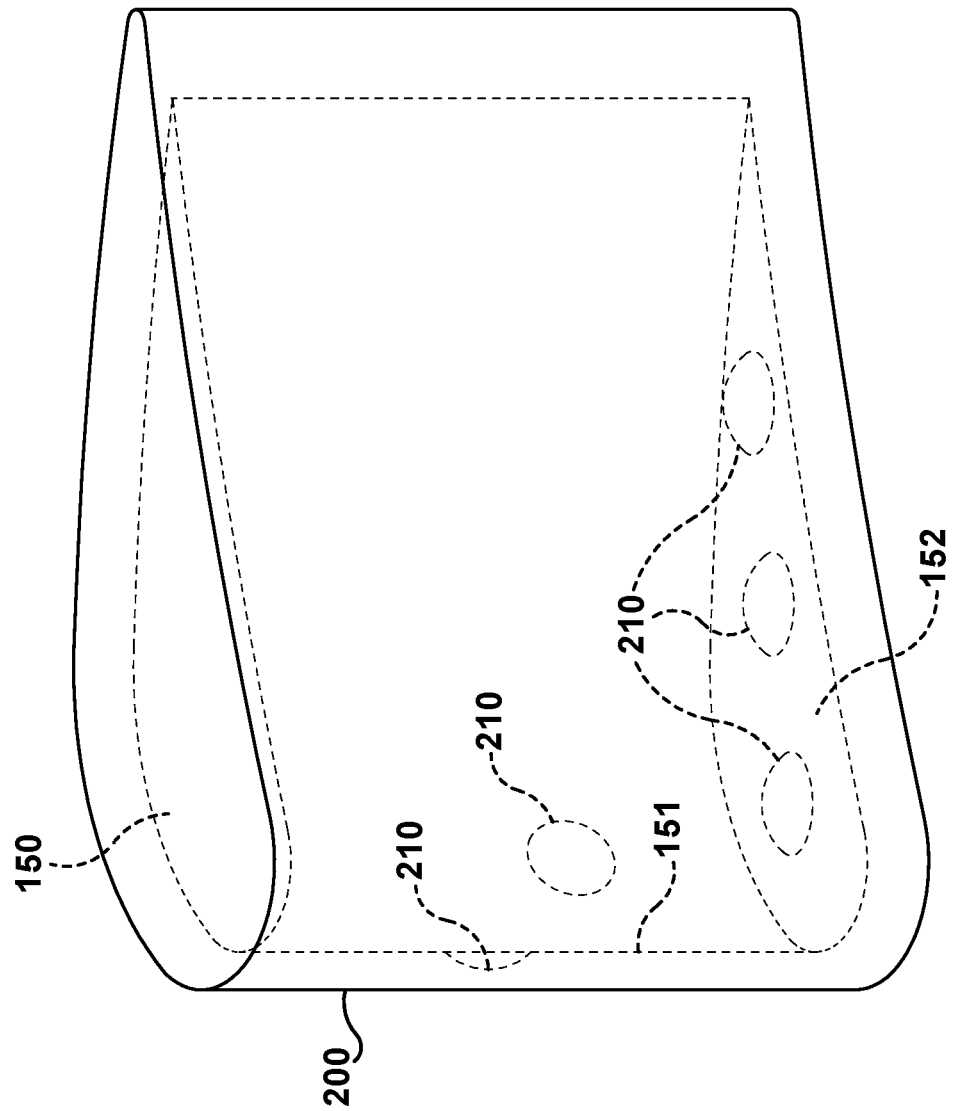
FIG. 6 illustrates an impingement insert with filter mounds configured to be disposed in a turbine component, according to aspects of the disclosure.

In FIG. 6, the impingement insert 150 is illustrated in an airfoil as the turbine component 200. However, the configuration of the turbine component 200 hot gas path part is merely demonstrative and not intended to limit the embodiments in any manner. In FIG. 6, the filter mounds 210 are illustrated inside wall portions 151 of the impingement insert 150 and along a bottom wall portion 152 of the impingement insert 150. The positioning of the filter mounds 210, as embodied by the disclosure, can be at locations that are aligned with cooling air flow with the turbine component 200.

Filter mound 210 includes a plurality of holes 220 around the surface of the filter mound 210. Each hole 220 extends from an outer side of the filter mound wall 217 through wall 217 to interior 211 of filter mound 210, such that air from outside filter mound 210 can fluidly communicate with and through interior 211 of filter mound 210. Holes 220 can be formed from any method, such as, but not limited to, machining, drilling, laser drilling, formation with the additive manufacturing of filter mound 210, or other suitable methods, now known or hereinafter developed.

Filter mound 210 can be formed integrally with turbine component 200. In one aspect of the disclosure, filter mound 210 can be formed integrally with turbine component 200 during an additive manufacturing process as described herein. In other aspects of the embodiment, filter mound 210 can be formed integrally with turbine component 200 by brazing filter mound 210 to turbine component 200, machining filter mound 210 and turbine component 200 together, electrical discharge machining filter mound 210 and turbine component 200 together, or any other manufacturing process now known or hereinafter developed.

Accordingly, given the benefits of additive manufacturing, filter mound 210 can be provided with various patterns of holes 220 in wall 217 of filter mound 210. Holes 220 through wall 217 can be uniformly positioned around filter mound 210. In another aspect embodied by the disclosure, holes 220 through wall 217 can be non-uniformly positioned or randomly positioned around filter mound 210.

Additionally, in a further aspect embodied by the disclosure, holes 220 can be provided in various shapes, configurations, and relationships. While FIGS. 1-5 show holes with a circular periphery, FIG. 1 also illustrates several holes 221 including a triangular polygonal shape or a rectangular polygonal shape. Holes 221 are merely illustrative of the multitude of shapes that holes 220 in filter mound 210 can define, including, but not limited to, holes having an ellipsoid periphery, a polygonal periphery, and an irregular periphery.

Figure 2:
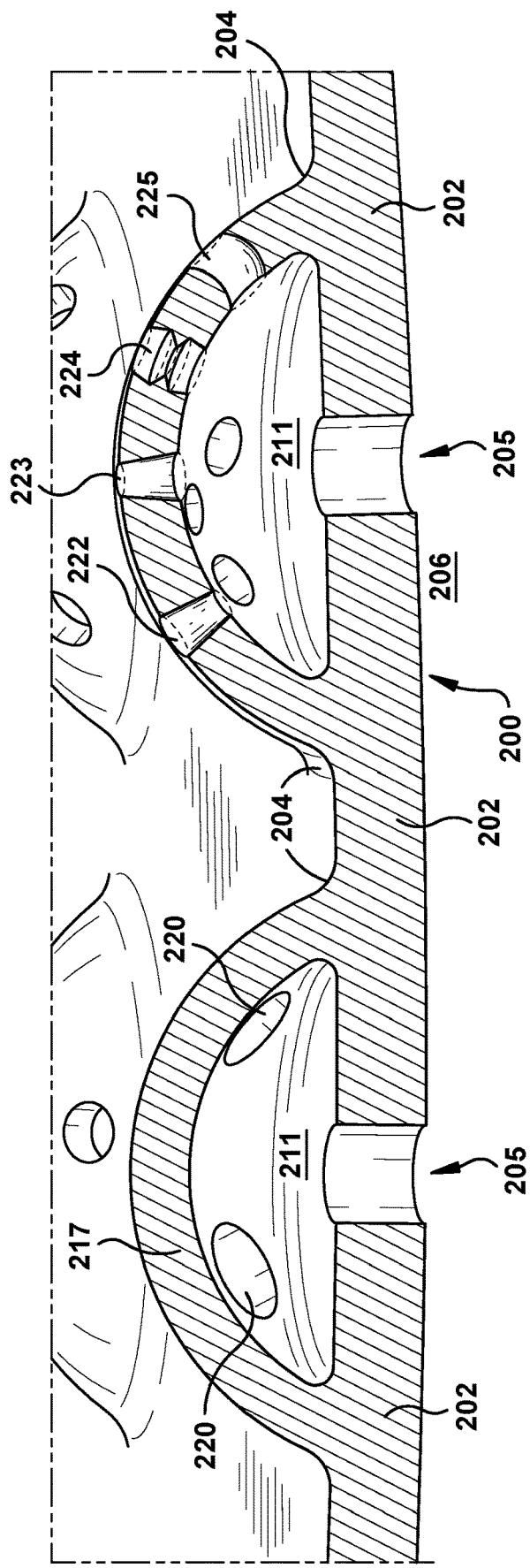
FIG. 2 illustrates a side sectional view of filter mounds according to aspects embodied by the disclosure.

In accordance with a further aspect embodied by the disclosure, holes 220 can be provided with a constant diameter through wall 217 (e.g., holes 220 in filter mound 210 on the left in FIG. 2). Moreover, as shown on the right of FIG. 2, filter mound 210 may include a hole 222 with a decreasing diameter from the outside of filter mound 210 through wall 217 to the interior 211 of filter mound 210. In still yet another aspect as embodied by the disclosure, filter mound 210 may alternately or additionally include a hole 223 with an increasing diameter from the outside of filter mound 210 through wall 217 to the interior 211 of filter mound 210. Moreover, filter mound 210 may alternately or additionally include a hole 224 with a varying diameter from the outside of filter mound 210 through wall 217 to the interior 211 of filter mound 210. In yet another aspect embodied by the disclosure, filter mound 210 may alternately or additionally include a hole 225 that is curved through wall 217 from exterior to interior of filter mound 210. Accordingly, numerous hole 220 configurations are possible and within the scope embodied by the disclosure.

Filter mounds 210 are positioned on, and additively manufactured integrally with, an outer wall 202 of turbine component 200 or an inside surface (wall 151 or bottom 152) of an impingement insert 150 configured for installation within a turbine component 200. Accordingly, a smooth transitional interface 204 is formed at an intersection of filter mound 210 and turbine component 200, impingement insert wall 151, or impingement insert bottom 152. Further, the outer periphery of filter mound 210 includes smooth, non-angular transitions, which will reduce catch points for any debris in an incoming cooling air supply to turbine component 200. Thus, as cooling air approaches filter mound 210, the incoming cooling air supply will flow in a substantially non-turbulent fashion into holes 220 in filter mound 210. After the incoming cooling air supply passes through holes 220, the incoming cooling air supply then flows through turbine component cooling air supply hole 205 for cooling turbine component 200. While the Figures illustrate holes 220 as having a circular periphery and the filter mound 210 as being substantially semi-circular in cross-section, this configuration is merely demonstrative of various filter mound 210 configurations embodied by the disclosure. Holes 220 are smaller in diameter than turbine component cooling air supply holes 205 (or impingement holes of the impingement insert 150, not shown) to filter debris that could clog turbine component cooling air supply holes 205 (or impingement holes).

Filter mound 210 with holes 220 can function as a filter of the incoming cooling air supply. Accordingly, debris that may be present in an incoming cooling air supply can be prevented from passing through filter mound 210 and clogging downstream cooling air supply hole 205. For instance, filter mound 210 and holes 220 will act as a "filter" of cooling air entering the interior area 211 (hereinafter "interior" 211) of filter mound 210, thus reducing the likelihood of debris entering and accumulating in turbine component cooling air supply hole 205. Holes 220 on filter mound 210 are provided with a diameter that prevents substantially all, if not most, debris from passing therethrough.

Further, as embodied by the disclosure, as noted above, each filter mound 210 includes a plurality of holes 220 that permit cooling flow to turbine component cooling air supply hole 205. In preventing debris from passing through the filter mound 210 to the turbine component cooling air supply hole 205, one or more holes 220 in filter mound 210 can become clogged with debris. Even if one or more holes 220 are clogged, as embodied by the disclosure, little impact, if any, will be realized in cooling air supply flow to the turbine component cooling air supply hole 205. When some holes 220 are clogged, other holes 220 in filter mound 210 will remain clear for cooling air to pass therethrough to turbine component cooling air supply hole 205.

While the discussion above refers to the function of filter mounds 210 integral with an interior surface of an outer wall 202 of a turbine component 200, it should be understood that filter mounds 210 function similarly if installed on an inside wall 151 or bottom surface 152 of impingement insert 150 (as shown in FIG. 6). Cooling air directed into a plenum defined by the impingement insert 150 passes through filter mounds 210 and is directed through impingement holes (not shown). The cooling air is directed as discrete cooling jets against the interior surface of the outer wall 202 of the turbine component 200. Because the filter mounds 210 prevent the likelihood of clogging of the impingement holes, the cooling air supply to the turbine component 200 is maintained, thus ensuring adequate cooling of the turbine component 200. It should be understood, therefore, that impingement insert 150 could be substituted for turbine component 200 in FIGS. 1-5 and 10, and that impingement insert inside wall 151 or bottom surface 152 could be substituted for the component surface 202 shown in FIGS.

1-5 and 10. Likewise, references to the turbine component cooling air supply hole 205 should be understood as applying equally to an impingement cooling hole of impingement insert 150.

Wall 217 of filter mound 210 provides a first blockage structure for debris entrained in the cooling air flowing through turbine component cooling air supply hole 205. Another aspect of the embodiments provides filter mound 210 with additional blockage structures in interior 211 of filter mound 210. Additional blockage structures, as embodied by the disclosure, are provided to reduce the likelihood of debris from clogging turbine component cooling air supply hole 205. Additional blockage structures in interior 211 can be provided to inhibit debris from moving to and clogging turbine component cooling air supply hole 205.

Additionally, and/or alternatively, additional blockage structures in interior 211 are provided to break up or fracture debris that enters through any hole 220. The additional blockage structures in interior 211 may break debris into smaller particles so the fractured debris can freely pass through turbine component cooling air supply hole 205 without clogging turbine component cooling air supply hole 205 and impairing the cooling of turbine component 200. Each additional blockage structure in interior 211 is additively manufactured with turbine component 200 and filter mound 210.

Figure 3:
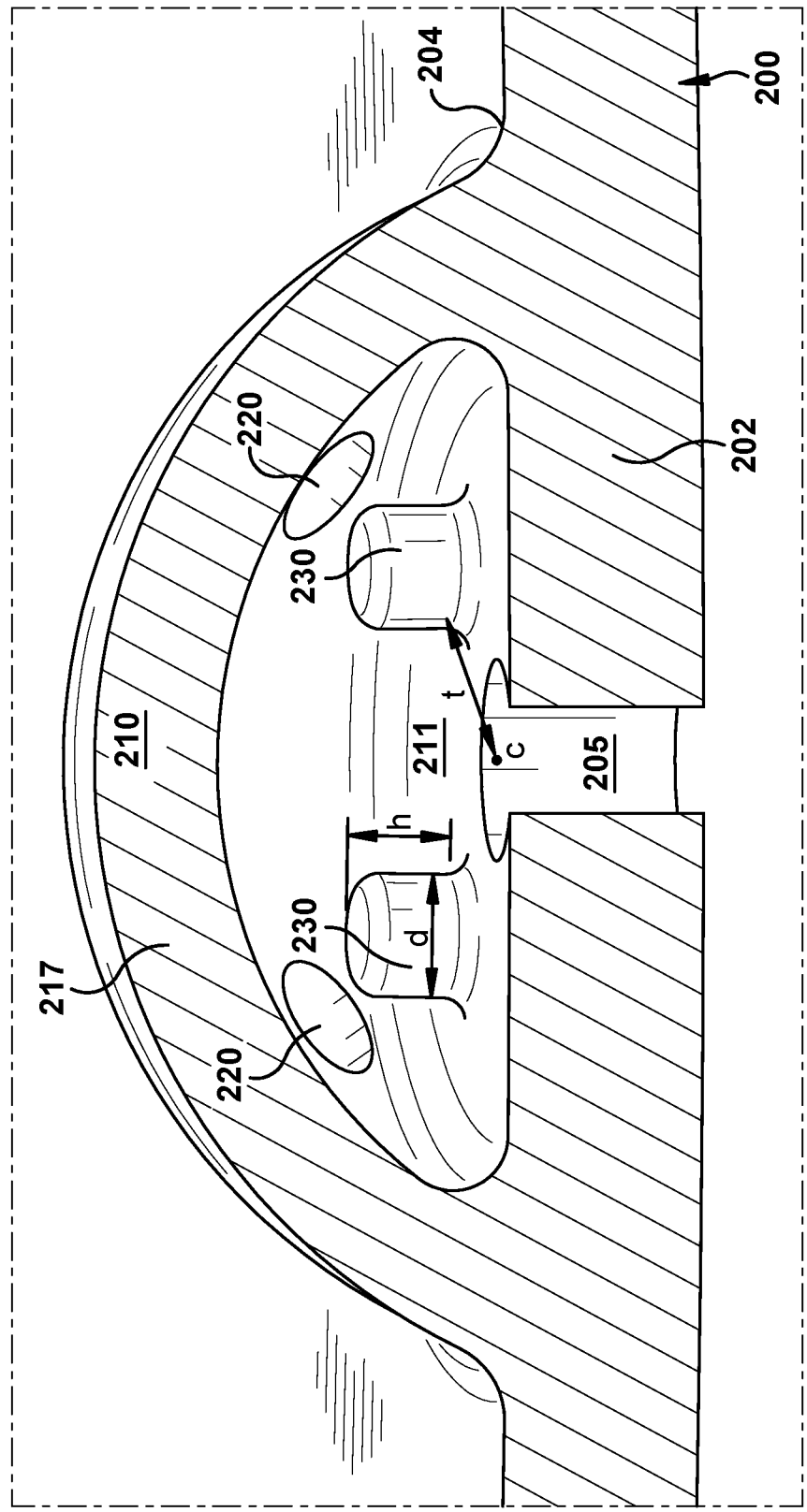
FIG. 3 illustrates a side sectional view of a filter mound with additional blockage structure in the interior of the filter mound, according to aspects embodied by the disclosure.
Figure 4:
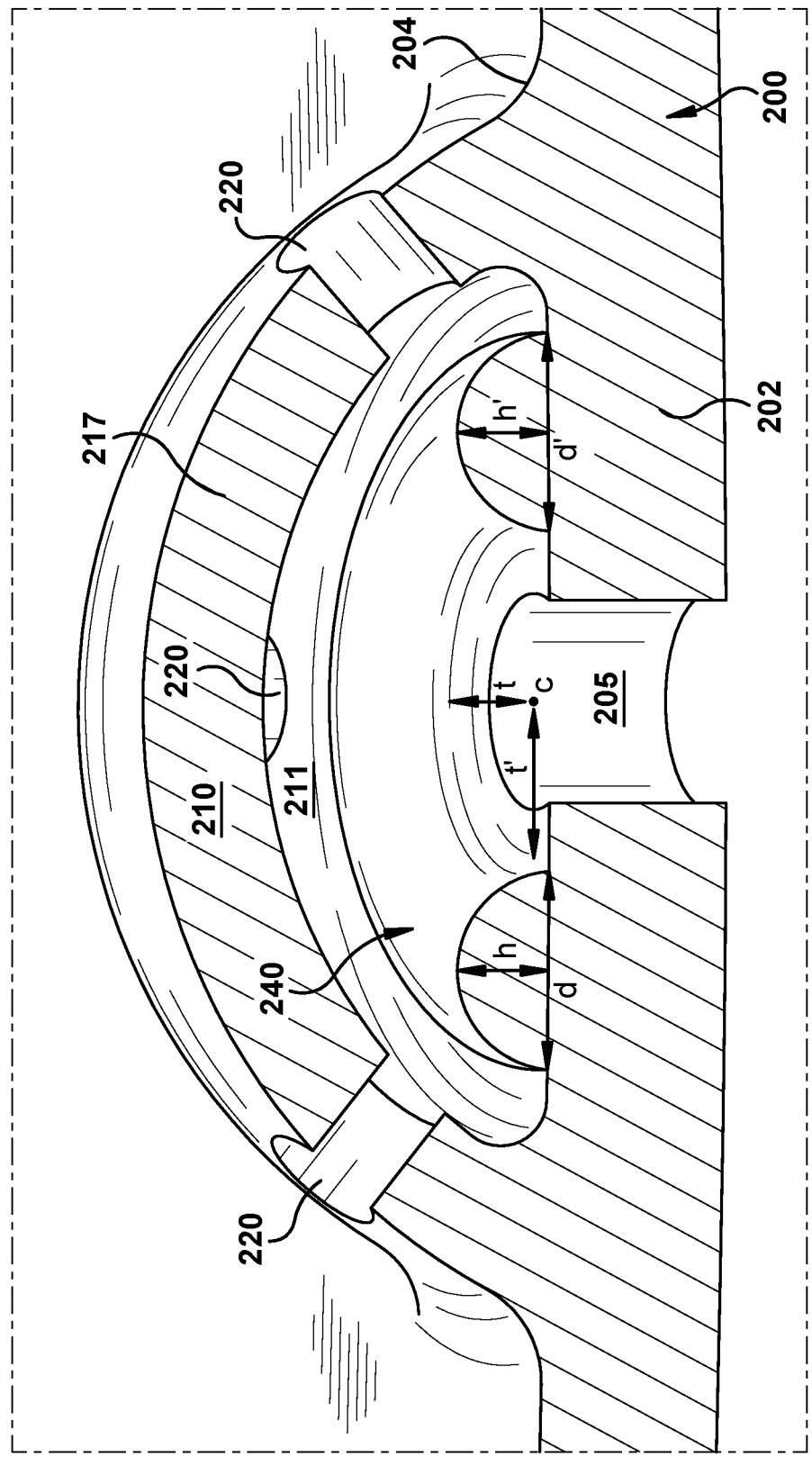
FIG. 4 illustrates a side sectional view of a further filter mound with another additional blockage structure in the interior of the filter mound, according to aspects embodied by the disclosure.
Figure 5:
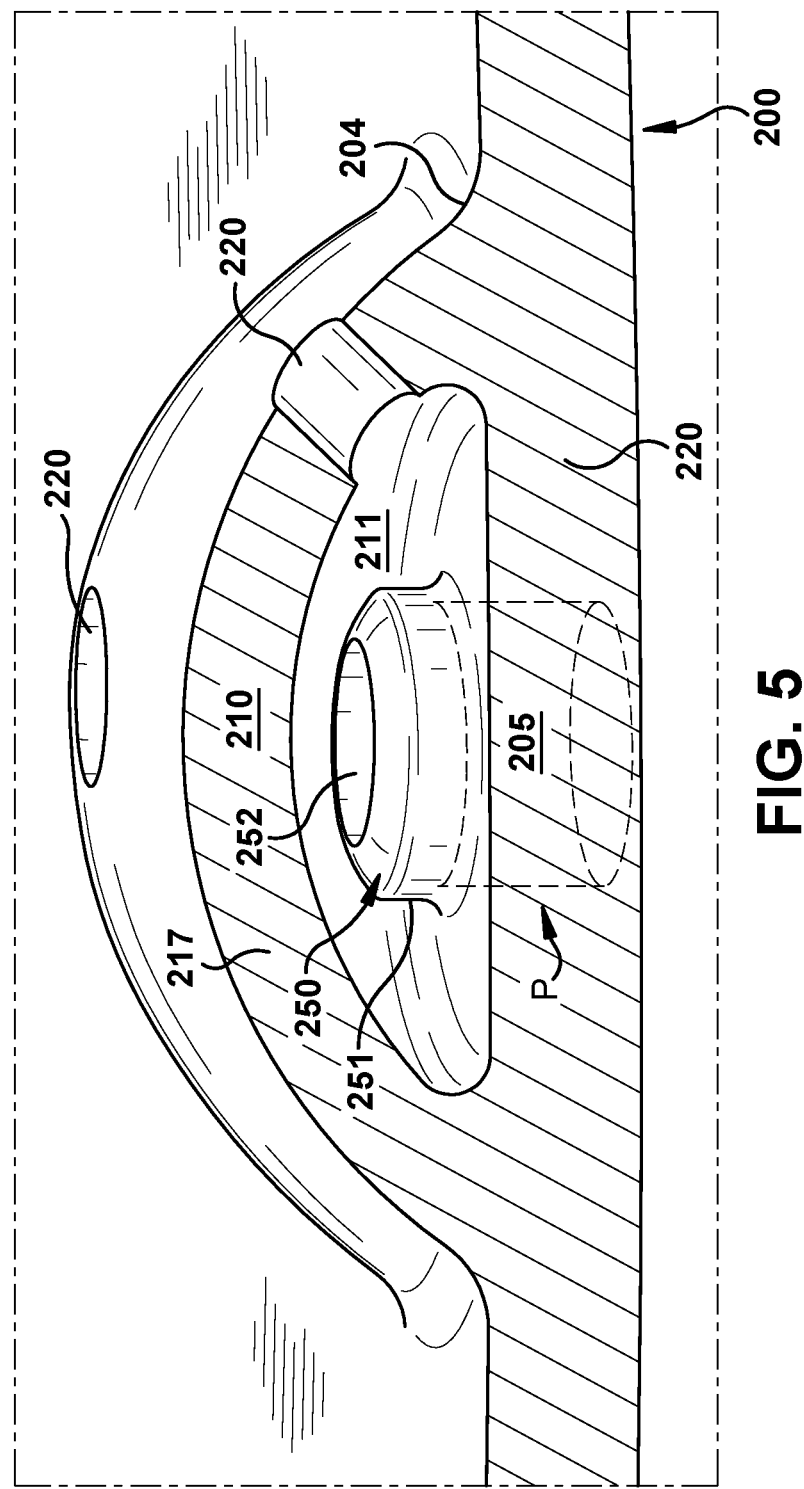
FIG. 5 illustrates a side sectional view of another filter mound with further additional blockage structure in the interior of the filter mound, according to aspects embodied by the disclosure.

Additional blockage structures in interior 211 of filter mound 210 are illustrated in FIGS. 3-5. In FIG. 3, addition blockage structures can include at least one pedestal 230. Each at least one pedestal 230 is additively manufactured with filter mound 210 and turbine component 200 (or impingement insert 150). In FIG. 3, two pedestals 230 are illustrated, but as embodied by the disclosure, the number of pedestals is at least one, possibly two, as illustrated. However, the scope of the embodiments includes any number of pedestals 230 including but not limited to 2, 3, 4, or more.

Each pedestal 230 can be formed to have the same elevation "h" from outer wall 202 of turbine component 200 or impingement insert 150. Alternatively, pedestals 230 can be formed to have different elevations "h" from outer wall 202 of turbine component 200 or impingement insert 150.

Moreover, in accordance with another aspect of the embodiments, each pedestal 230 in interior 211 can be formed to have the same diameter "d". In another aspect of the embodiments, pedestals 230 in a common interior 211 can be formed to have different diameters "d."

In a further aspect, pedestals 230 as in FIG. 3 can be equidistantly circumferentially spaced from each other in interior 211 of filter mound 210. Alternatively, pedestals 230 can be randomly circumferentially spaced from each other in interior 211 of filter mound 210.

Further, another aspect of the embodiments includes positioning pedestals 230 at a constant distance "t" from a center point "c" of turbine component cooling air supply hole 205. Alternatively, embodiments of the disclosure include positioning pedestals 230 at different distances "t" from the center point "c" of turbine component cooling air supply hole 205.

Therefore, pedestals 230 can be provided to stop debris from moving to and clogging turbine component cooling air supply hole 205, and, additionally or alternatively, pedestals 230 in interior 211 are provided to break up or fracture debris that enters through any hole 220. Pedestals 230 can achieve the stopping and breaking of debris regardless of elevation "h" of pedestals 230 from outer wall 202 of turbine component 200 or impingement insert 150, circumferential spacing from each other, or spacing configuration from a center point "c" of turbine component cooling air supply hole 205.

FIG. 4 illustrates an alternate internal additional blockage structure in interior 211, where additional blockage structure includes a circumferential raised ring 240. Circumferential raised ring 240 substantially circumscribes turbine component cooling air supply hole 205. Circumferential raised ring 240 is additively manufactured with filter mound 210 and turbine component 200 or impingement insert 150.

Each circumferential raised ring 240 can be formed to have a constant elevation "h" from outer wall 202 of turbine component 200 or impingement insert 150. Alternatively, circumferential raised ring 240 can be formed to have varying elevations "h'" from outer wall 202 of turbine component 200 or impingement insert 150 as circumferential raised ring 240 encircles turbine component cooling air supply hole 205.

Moreover, in accordance with another aspect of the embodiments, circumferential raised ring 240 in interior 211 can be formed to have a constant diameter "d." In another aspect of the embodiments, circumferential raised ring 240 can be formed to have different diameters "d'" as circumferential raised ring 240 encircles turbine component cooling air supply hole 205.

According to another aspect of the embodiments, the turbine component cooling air supply hole 205 can be positioned at any location within the interior 211 of the filter mound 210 (that is, a periphery of filter mound 210 need not be concentric with turbine component cooling air supply hole 205). While some figures illustrate the turbine component cooling air supply hole 205 at a central location within the interior 211, the turbine component cooling air supply hole 205 can located anywhere in the interior 211 of the filter mound 210. Further, in an additional aspect embodied by the disclosure, one or more turbine component cooling air supply holes 205 can be provided within the interior 211 of the filter mound 210. For instance, filter mound 210 may be sized to cover two or more turbine component cooling air supply holes 205.

In a further aspect, one circumferential raised ring 240 can be provided as the additional blockage structure as in FIG. 4. Alternatively (not shown for ease of description and illustration), additional circumferential raised rings 240 may be provided in interior 211 of filter mound 210. These additional circumferential raised rings 240 can be equidistantly circumferentially spaced from each other in interior 211 of filter mound 210. Alternatively, circumferential raised rings 240 can be randomly circumferentially spaced from each other in interior 211 of filter mound 210.

Further, another aspect of the embodiments includes positioning circumferential raised ring 240 at a constant distance "t" from a center point "c" of turbine component cooling air supply hole 205. Alternatively, embodiments of the disclosure include positioning circumferential raised ring 240 at differing distances "t'" from the center point "c" of turbine component cooling air supply hole 205.

Therefore, circumferential raised ring 240 can be provided to stop debris from moving through interior 211 of filter mound 210 and clogging turbine component cooling air supply hole 205, and additionally, or alternatively, circumferential raised ring 240 in interior 211 can be provided to break up or fracture debris that enters through any hole 220. Circumferential raised ring 240 can achieve the stopping and breaking of debris of elevation "h" from outer wall 202 of turbine component 200 (or impingement insert 150), circumferential spacing from each other, or spacing configuration from center point "c" of turbine component cooling air supply hole 205.

An alternate additional blockage structure is illustrated in FIG. 5. FIG. 5 illustrates an extruded or extended hole 250 (hereinafter "extruded hole 250") that extends from turbine component cooling air supply hole 205. Extruded hole 250 is additively manufactured with filter mound 210 and turbine component 200 or impingement insert 150. Extruded hole 250 substantially extends from perimeter "p" (FIG. 5) of component cooling air supply hole 205. Also, extruded hole 250 includes an outer perimeter 251 and an inner perimeter 252. As embodied by the disclosure, extruded hole 250 can be formed so outer perimeter 251 is coextensive with perimeter "p" of turbine component cooling air supply hole 205. In another aspect of the embodiment, extruded hole 250 can be formed so inner perimeter 252 is coextensive with perimeter "p" of turbine component cooling air supply hole 205. Furthermore, in a further aspect of the embodiment, turbine component cooling air supply hole 205 can be formed with its perimeter "p" positioned intermediate outer perimeter 251 and inner perimeter 252 of extruded hole 250.

Each extruded hole 250 can be formed to have a constant elevation "h" from outer wall 202 of turbine component 200. Alternatively, extruded hole 250 can be formed to have varying elevations "h'" from outer wall 202 of turbine component 200 (or impingement insert 150) as extruded hole 250 encircles turbine component cooling air supply hole 205.

Moreover, in accordance with another aspect of the embodiments, inner perimeter 252 and outer perimeter 251 of extruded hole 250 can be formed to be symmetrical or non-symmetrical, to have different cross-sectional shapes, and/or to be non-concentric, as extruded hole 250 encircles turbine component cooling air supply hole 205.

Further, another aspect of the embodiments includes positioning extruded hole 250 at a constant distance t from a center point c of turbine component cooling air supply hole 205. Alternatively, embodiments of the disclosure include positioning extruded hole 250 at differing distances t' from a center point c of turbine component cooling air supply hole 205.

Therefore, extruded hole 250 can be provided to stop debris from moving to and clogging turbine component cooling air supply hole 205. Additionally, or alternatively, extruded hole 250 in interior 211 is provided to break up or fracture debris that enters through any hole 220. Extruded hole 250 can achieve the stopping and breaking of debris regardless of elevation h from outer wall 202 of turbine component 200 or spacing configuration from center point c of turbine component cooling air supply hole 205.

Per another aspect of the embodiments, the blockage structure includes two or more of a pedestal 230, circumferential raised ring 240, and extruded hole 250 provided together in interior 211 of filter mound 210. Accordingly, as embodied by the disclosure, blockage structure can include pedestal 230 and circumferential raised ring 240; or pedestal 230 and extruded hole 250; circumferential raised ring 240 and extruded hole 250; or all of pedestal 230, circumferential raised ring 240, and extruded hole 250. Although these configurations are not illustrated separately, such arrangements are easily configured.

Therefore, as embodied by the disclosure, debris from upstream components within a gas turbine can be prevented from entering the cooling air supply of a hot gas path component. Filter mound 210 can be provided at each turbine component cooling air supply hole 205 or at some, but not all, turbine component cooling air supply entrance holes 205 to allow for clogging of holes 220 without impacting or blocking total flow to turbine component cooling air supply hole 205. Additionally, or alternatively, internal blockage structure(s) in interior 211 are provided and configured to be able to break up or fracture debris that may enter through any hole 220.

Figure 10:
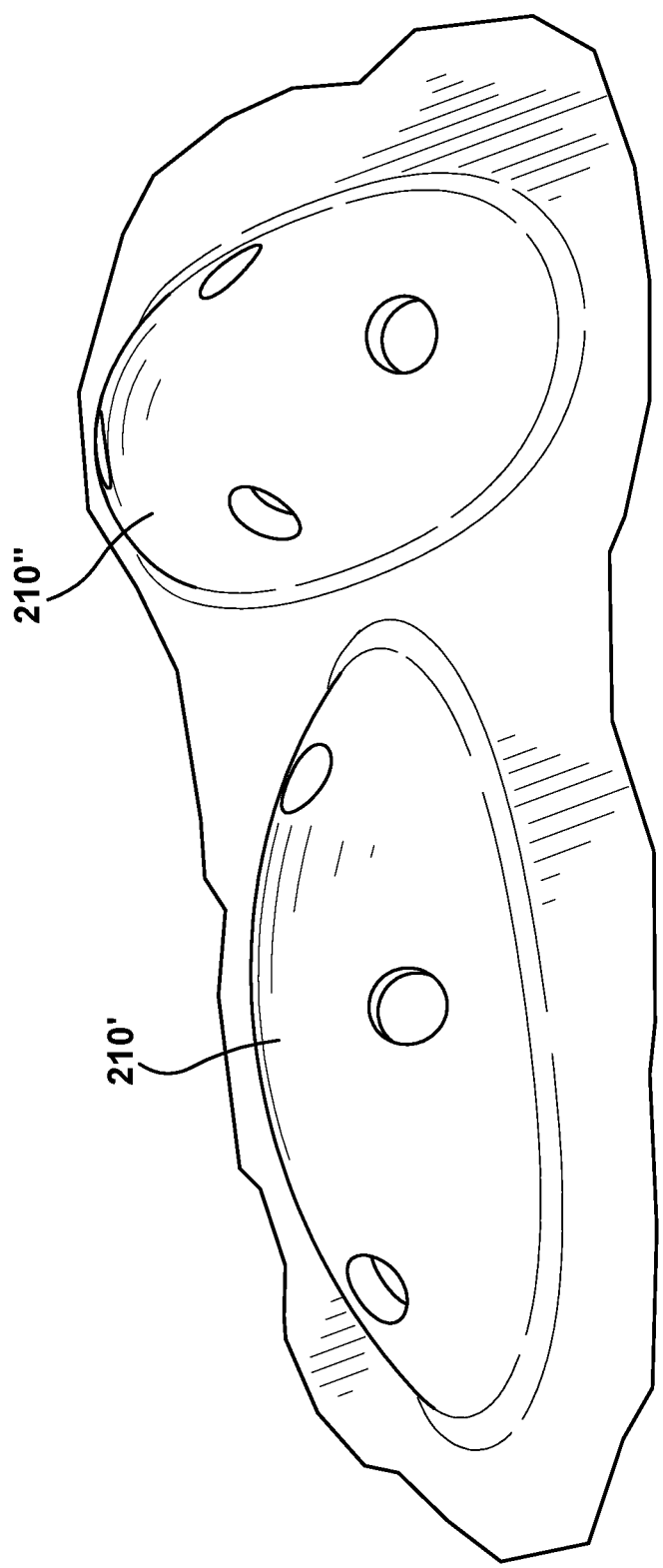
FIG. 10 illustrates further aspects of filter mounds, according to aspects embodied by the disclosure.

FIG. 10 illustrates further aspects of filter mounds according to aspects as embodied by the disclosure. In FIG. 10, the illustrated filter mounds are non-symmetrical. Filter mound 210' is longer in a longitudinal orientation (directions and orientations are with respect to FIG. 10), and filter mound 210" is longer in the latitudinal orientation of FIG. 10. As embodied by the disclosure, a filter mound 210, 210', 210" may be non-symmetrical in any orientation.

Figure 7:
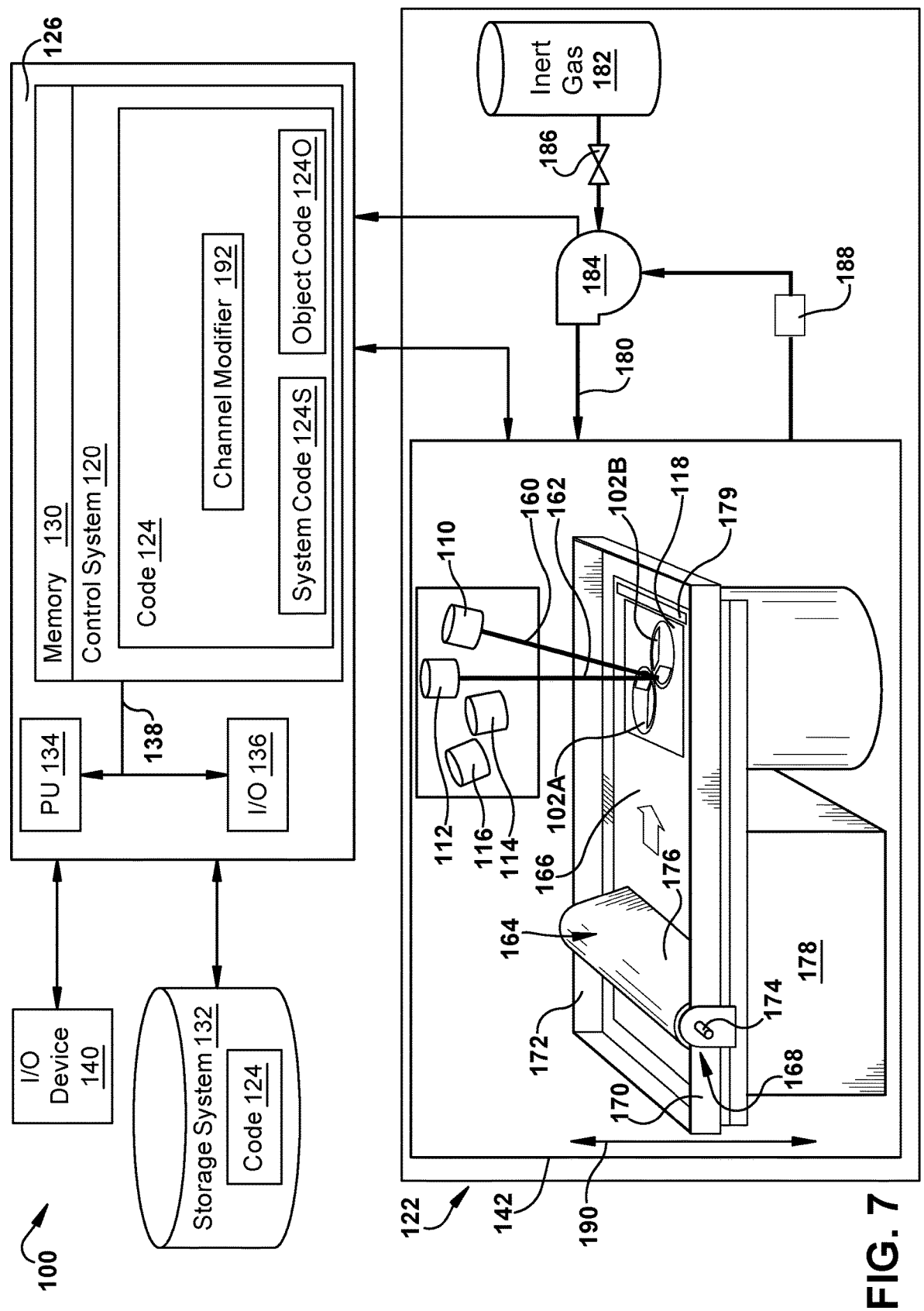
FIG. 7 illustrates a block diagram of an additive manufacturing system and process including a non-transitory computer readable storage medium storing code representative of a turbine component with a filter mound, according to aspects embodied by the disclosure.

FIG. 7 illustrates a schematic/block view of an illustrative computerized metal powder additive manufacturing system 100 (hereinafter 'AM system 100') for generating an object(s) 102, which may include one large object or multiple objects, e.g., two objects 102A, 102B as shown, of which only a single layer is shown. Aspects, as embodied by the disclosure, will be described relative to building object(s) 102 using multiple irradiation devices, e.g., four lasers 110, 112, 114, 116, but it is emphasized and will be readily recognized that the teachings of the disclosure are equally applicable to build multiple object(s) 102 using any number of irradiation devices, i.e., one or more.

In this illustration, AM system 100 is arranged for direct metal laser melting (DMLM). It is understood that aspects, as embodied by the disclosure, are equally applicable to other forms of metal powder additive manufacturing, such as, but not limited to, direct metal laser sintering (DMLS), selective laser sintering (SLS), electron beam melting (EBM), and perhaps other forms of additive manufacturing. Object(s) 102 are illustrated as circular elements; however, it is understood that the additive manufacturing process can be readily adapted to manufacture any shaped object, a large variety of objects, and a large number of objects on a build platform 118.

AM system 100 generally includes a metal powder additive manufacturing control system 120 ("control system") and an AM printer 122. As will be described, control system 120 executes object code 124O to generate object(s) 102 using multiple irradiation devices 110, 112, 114, 116. In the example shown, four irradiation devices may include four lasers. However, aspects, as embodied by the disclosure, are applicable to any irradiation device, e.g., an electron beam, laser, etc. Control system 120 is shown implemented on computer 126 as computer program code. To this extent, computer 126 is shown including a memory 130 and/or storage system 132, a processor unit (PU) 134, an input/output (I/O) interface 136, and a bus 138. Further, computer 126 is shown in communication with an external I/O device/resource 140 and storage system 132. In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the objects in computer 126, and I/O device 140 can comprise any device that enables a user to interact with computer 126 (e.g., keyboard, pointing device, display, etc.).

Computer 126 is only representative of various possible combinations of hardware and software. For example, processor unit (PU) 134 may be a single processing unit or may be distributed across one or more processing units in one or more locations, e.g., on a client and server. Similarly, memory 130 and/or storage system 132 may reside at one or more physical locations. Memory 130 and/or storage system 132 can include any combination of various types of non-transitory computer readable storage medium including magnetic media, optical media, random access memory (RAM), read only memory (ROM), etc. Computer 126 can be any type of computing device, such as an industrial controller, a network server, a desktop computer, a laptop, a handheld device, etc.

As noted, AM system 100 and, in particular, control system 120 execute program code 124 to generate object(s) 102. Program code 124 can include, inter alia, a set of computer-executable instructions (herein referred to as 'system code 124S') for operating AM printer 122 or other system parts, and a set of computer-executable instructions (herein referred to as 'object code 124O') defining object(s) 102 to be physically generated by AM printer 122. As described herein, additive manufacturing processes begin with a non-transitory computer readable storage medium (e.g., memory 130, storage system 132, etc.) storing program code 124. System code 124S for operating AM printer 122 may include any now known or later developed software code capable of operating AM printer 122.

Object code 124O defining object(s) 102 may include a precisely defined 3D model of an object and can be generated from any of a large variety of well-known computer aided design (CAD) software systems such as AutoCAD®, TurboCAD®, DesignCAD 3D Max, etc. In this regard, object code 124O can include any now known or later developed file format. Furthermore, object code 124O representative of object(s) 102 may be translated between different formats. For example, object code 124O may include Standard Tessellation Language (STL) files, which are created for stereolithography CAD systems, or an additive manufacturing file (AMF), which is an international standard that is an extensible markup-language (XML) based format designed to allow any CAD software to describe the shape and composition of any three-dimensional object to be fabricated on any AM printer. Object code 124O representative of object(s) 102 may also be converted into a set of data signals and transmitted, received as a set of data signals and converted to code, stored, etc., as necessary. In any event, object code 124O may be an input to AM system 100 and may come from a part designer, an intellectual property (IP) provider, a design company, the operator or owner of AM system 100, or from other sources. In any event, control system 120 executes system code 124S and object code 124O, dividing object(s) 102 into a series of thin slices that AM printer 122 assembles in successive layers of material to form object 102.

AM printer 122 may include a processing chamber 142 that is sealed to provide a controlled atmosphere for printing object(s) 102, e.g., a set pressure and temperature for lasers, or a vacuum for electron beam melting. A build platform 118, upon which object(s) 102 is/are built, is positioned within processing chamber 142. A number of irradiation devices 110, 112, 114, 116 are configured to melt layers of metal powder on build platform 118 to generate object(s) 102. While four irradiation devices 110, 112, 114, 116 will be described herein, it is emphasized that the teachings of the disclosure are applicable to a system employing any number of sources, e.g., 1, 2, 3, or 5 or more.

Figure 8:
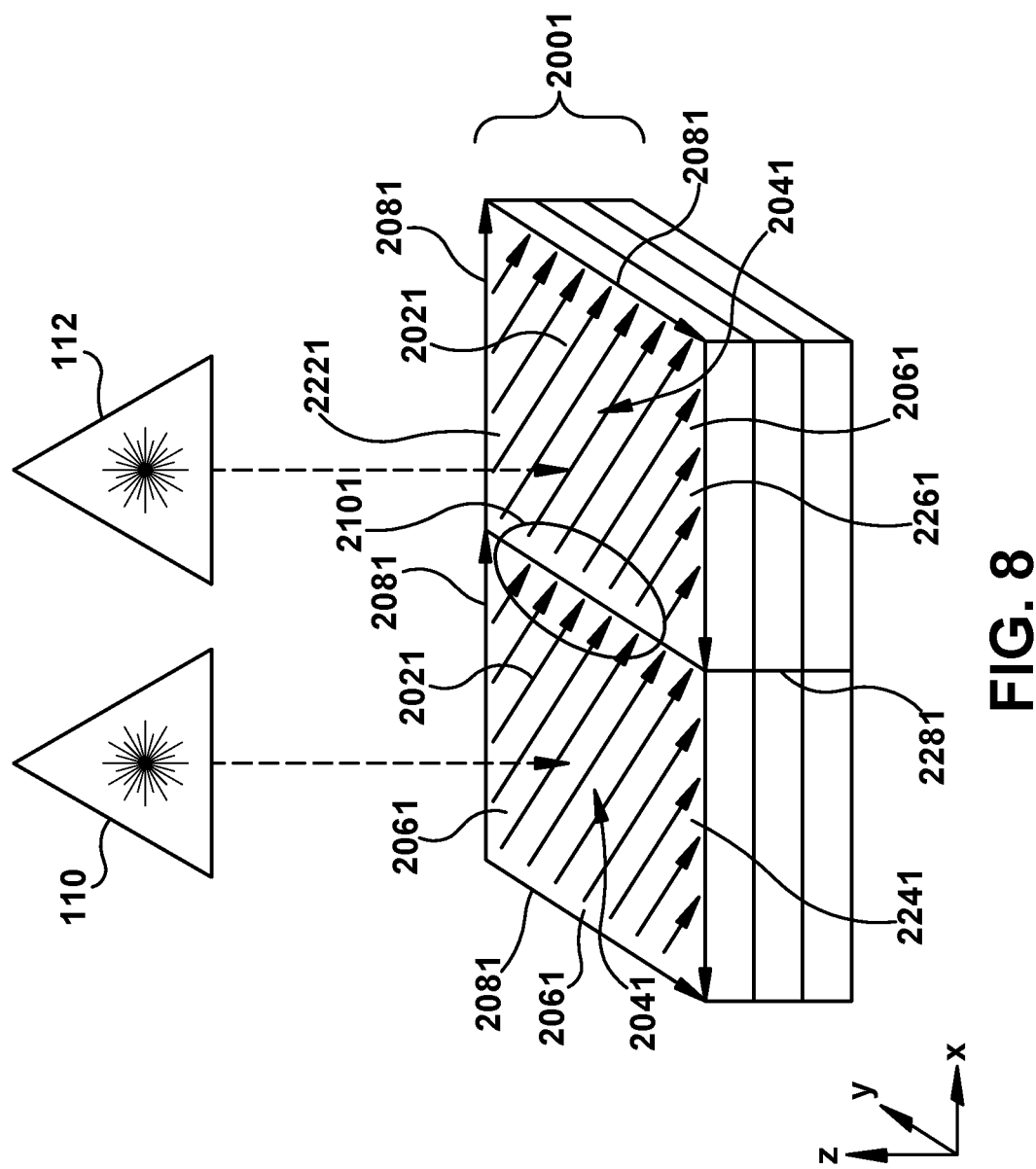
FIG. 8 illustrates a schematic perspective view of a two-irradiation device additive manufacturing system building a turbine component with a filter mound, according to aspects embodied by the disclosure.
Figure 9:
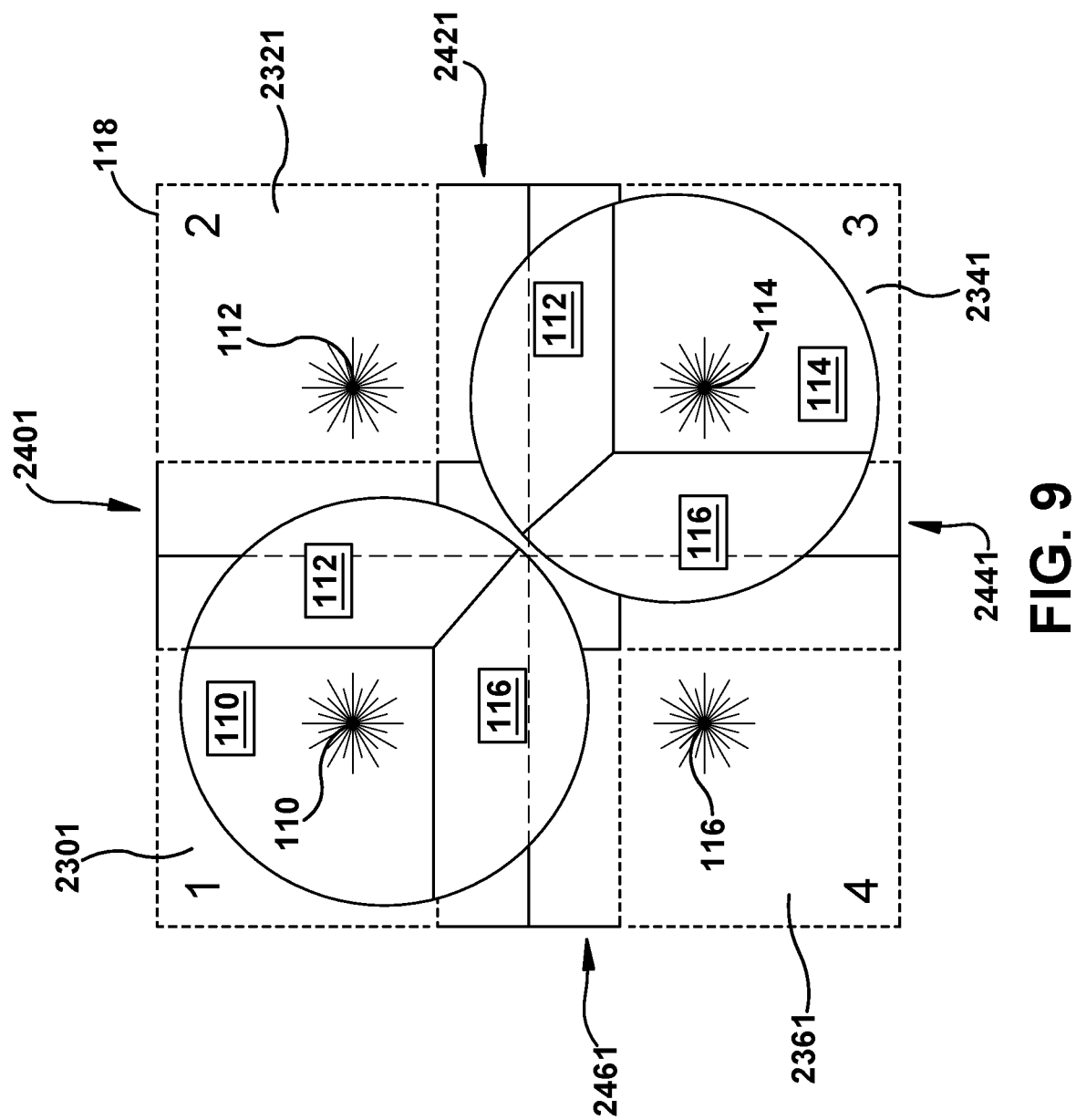
FIG. 9 illustrates a schematic plan view of respective fields of a four-irradiation device additive manufacturing system, according to embodiments of the disclosure.

FIG. 8 illustrates a schematic perspective view of irradiation beams (dashed lines) of AM system using two irradiation devices 110, 112, e.g., lasers. Each laser 110, 112 has its own field (1 and 2, respectively) upon which it can work (FIG. 9). Each irradiation device 110, 112 may work within only a small portion of its respective field at any given time. Each field and the scan vectors (paths) are assigned to one or the other source 110, 112 with an interface 2101 (within circle, FIG. 8) where fields 1, 2 of pair of sources 110, 112 meet. Which scan vector is made by which source usually depends on the region that can be reached by each source. Interface 2101 in body 2221 of object 2001 defines a first portion 2241 and a second portion 2261 of body 2221 made by different irradiation devices 110, 112 of multiple irradiation device AM system 100 during a single build. Here, fields 1, 2 meet at a line, creating a planar interface 2281 in object 2001.

Each irradiation device 110, 112 is calibrated in any now known or later developed manner. That is, each irradiation device 110, 112 has had its laser or electron beam's anticipated position relative to build platform 118 correlated with its actual position in order to provide an individual position correction (not shown) to ensure its individual accuracy.

During operation, the irradiation beam(s) are guided, e.g., by scanner mirrors for lasers or electromagnetic field/electric coils for electron beams, along scan vectors, which are indicated in FIG. 8 by arrows on a top surface of illustrative object 2001. Internal scan vectors 2021 melt inner regions 2041 of object 2001 that scan linearly across a layer, and a very thin border 2061 is melted with one to three contour scan vectors 2081 that only follow a desired outer edge of the layer.

FIG. 9 illustrates a schematic plan view of irradiation beams of AM system 100 using four irradiation devices 110, 112, 114, 116, e.g., lasers. Each irradiation device 110, 112, 114, 116 has a field 1, 2, 3 or 4 including a non-overlapping field region 2301, 2321, 2341, 2361, respectively, in which it can exclusively melt metal powder, and at least one overlapping field region or interfaces 2401, 2421, 2441, 2461 in which two or more sources can melt metal powder. (Boxed numbers of sources 110, 112, 114, 116 indicate which source creates the shape illustrated thereabout). In this regard, each irradiation device 110, 112, 114, 116 may generate an irradiation beam (two shown, 160, 162, in FIG. 7), respectively, that fuses particles for each slice, as defined by object code 124O.

For example, in FIG. 7, irradiation device 110 is shown creating a layer of object 102 using irradiation beam 160 in one region, while irradiation device 112 is shown creating a layer of object 102 using irradiation beam 162 in another region. In one embodiment, each of plurality irradiation devices 110, 112, 114, 116 may create irradiation beams, e.g., 160, 162 (FIG. 7), having the same cross-sectional dimensions (e.g., shape and size in operation), power and scan speed. It is recognized that while four sources 110, 112, 114, 116 have been illustrated to describe an interface for overlapping fields, any two sources may create overlapping fields.

Returning to FIG. 7, an applicator 164 may create a thin layer of raw material 166 spread out as the blank canvas from which each successive slice of the final object will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and a linear actuator 174 such as an electric motor coupled to applicator 164 for moving it along rails 170, 172. Linear actuator 174 is controlled by control system 120 to move applicator 164. Other forms of linear transport systems may also be employed.

Applicator 164 take a variety of forms. In one embodiment, applicator 164 may include a member 176 configured to move along opposing rails 170, 172, and an actuator element (not shown in FIGs.) in the form of a tip, blade or brush configured to spread metal powder evenly over build platform 118, i.e., build platform 118 or a previously formed layer of object(s) 102, to create a layer of raw material. The actuator element may be coupled to member 176 using a holder (not shown) in any number of ways.

The process may use different raw materials in the form of metal powder. Raw materials may be provided to applicator 164 in a number of ways. In one embodiment, shown in FIG. 7, a stock of raw material may be held in a raw material source 178 in the form of a chamber accessible by applicator 164. In other arrangements, raw material may be delivered through applicator 164, e.g., through member 176 in front of its applicator element and over build platform 118. In any event, an overflow chamber 179 may be provided on a far side of applicator 164 to capture any overflow of raw material not layered on build platform 118. In FIG. 7, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, object(s) 102 may be made of a metal, which may include a pure metal or an alloy. In one example, the metal may include practically any non-reactive metal powder, i.e., non-explosive or non-conductive powder, such as, but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$). In another example, the metal may include practically any reactive metal such as, but not limited to, those known under their brand names: Inconel 738, IN738LC, Rene 108, FSX 414, X-40, X-45, MarM 247, MAR-M509, MAR-M302, CM247 or Merl 72/Polymet 972, some of which may be classified as a gamma prime hardened superalloy.

The atmosphere within processing chamber 142 is controlled for the particular type of irradiation device being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184 and/or a flow valve system 186 for inert gas to control the content of inert gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g. a tank, reservoir or other source. Any sensors (not shown) required to measure inert gas mixture 180 may be provided. Inert gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182 and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer, e.g., a build platform 118 may lower, and/or chamber 142 and/or applicator 164 may rise after each layer. Vertical adjustment system 190 may include any now known or later developed linear actuators to provide such adjustment that are under the control of control system 120.

In operation, build platform 118 with metal powder thereon is provided within processing chamber 142, and control system 120 controls the atmosphere within processing chamber 142. Control system 120 also controls AM printer 122, applicator 164 (e.g., linear actuator 174), and irradiation device(s) 110, 112, 114, 116 to sequentially melt layers of metal powder on build platform 118 to generate object(s) 102 according to embodiments of the disclosure. As noted, various parts of AM printer 122 may vertically move via vertical adjustment system 190 to accommodate the addition of each new layer, e.g., a build platform 118 may lower, and/or chamber 142 and/or applicator 164 may rise after each layer.

As will be appreciated by one skilled in the art, the present disclosure may be embodied as a system, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to illustrations and/or block diagrams of methods, apparatus (systems) and computer program products according to embodiments of the disclosure. It will be understood that the illustrations and/or block diagrams can be implemented by computer program instructions. These computer program instructions may be provided to a processor of a general purpose computer, special purpose computer, or other programmable data processing apparatus to produce an object or machine, such that the instructions, which execute via the processor of the computer or other programmable data processing apparatus, create means for implementing the functions/acts described in reference to the schematic diagrams.

These computer program instructions may also be stored in a computer-readable medium that can direct a computer or other programmable data processing apparatus to function in a particular manner. As a result, the instructions stored in the computer-readable medium produce an article of manufacture including instruction means, which implement the functions/acts described herein for the manufacture of object 102.

The computer program instructions may also be loaded onto a computer or other programmable data processing apparatus to cause a series of operational steps to be performed on the computer or other programmable apparatus to produce a computer implemented process. When the instructions are executed on the computer or other programmable apparatus, processes for implementing the functions/acts described herein for the manufacture of object 102 are carried out.

The foregoing drawings show some of the processing associated according to several embodiments of this disclosure. In this regard, each drawing represents a process associated with embodiments of the method described. It should also be noted that, in some alternative implementations, the acts described in reference to the drawings (e.g., FIGS. 7-9) may occur out of the order described or, for example, may in fact be executed substantially concurrently or in the reverse order, depending upon the act involved. Also, one of ordinary skill in the art will recognize that the processing may include additional steps or acts.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A gas turbine component comprising:
an outer wall and an internal cooling passage;
a cooling air supply hole through the outer wall in fluid communication with the internal cooling passage;
a filter mound disposed over the cooling air supply hole; wherein the filter mound includes:
a filter mound wall projecting from the turbine component and defining an interior of the filter mound; and
at least one hole in the filter mound wall extending through the filter mound wall, the at least one hole configured to permit cooling air supply to pass therethrough while blocking debris from passing through the interior of the filter mound and clogging the cooling air supply hole; and
wherein the turbine component and the filter mound are formed during manufacturing of the turbine component.

2. The gas turbine component according to claim 1, wherein the filter mound wall includes a raised rounded protrusion.

3. The gas turbine component according to claim 2, wherein the raised rounded protrusion defines a circular periphery and the interior being defined as a semi-circular interior.

4. The gas turbine component according to claim 1, wherein the at least one hole includes a plurality of holes.

5. The gas turbine component according to claim 4, wherein the plurality of holes is regularly spaced about the filter mound.

6. The gas turbine component according to claim 4, wherein the plurality of holes is irregularly spaced about the filter mound.

7. The gas turbine component according to claim 4, wherein the plurality of holes is randomly spaced about the filter mound.

8. The gas turbine component according to claim 1, wherein the turbine component and the filter mound are integrally formed during additive manufacturing of the turbine component.

9. The gas turbine component according to claim 1, further including additional blockage structure in the interior of the filter mound, the additional blockage structure in the interior of the filter mound configured for at least one of blocking debris from passing through the at least one hole and breaking up or fracturing debris entering the interior through the at least one hole.

10. The gas turbine component according to claim 9, wherein the additional blockage structure in the interior of the filter mound includes at least one pedestal on the outer wall of turbine component.

11. The gas turbine component according to claim 10, wherein the at least one pedestal includes a plurality of pedestals in the interior of the filter mound.

12. The gas turbine component according to claim 9, wherein the additional blockage structure in the interior of the filter mound includes at least one circumferential raised ring on the outer wall of the turbine component.

13. The gas turbine component according to claim 9, wherein the at least one circumferential raised ring surrounds the cooling air supply hole.

14. The gas turbine component according to claim 9, wherein the additional blockage structure in the interior of the filter mound includes an extruded hole extending from the cooling air supply hole on the outer wall of turbine component.

15. A filter for a cooling air supply hole in a gas turbine component including an outer wall, an internal cooling passage, and a cooling air supply hole through the outer wall in fluid communication with the internal cooling passage, the filter comprising:
a filter mound disposed over the cooling air supply hole;
wherein the filter mound includes:
a filter mound wall projecting from the turbine component and defining an interior of the filter mound, the filter mound wall defining a rounded protrusion; and
at least one hole in the filter mound wall extending through the filter mound wall configured to permit cooling air supply to pass therethrough while blocking debris from passing through the interior of the filter mound and clogging the cooling air supply hole;
wherein the gas turbine component and the filter mound are formed during manufacturing of the gas turbine component.

16. The filter for a cooling air supply hole in a gas turbine component according to claim 15, wherein the at least one hole includes a plurality of holes.

17. The filter for a cooling air supply hole in a gas turbine component according to claim 16, wherein the plurality of holes is at least one of:
regularly spaced about the filter mound; irregularly spaced about the filter mound; and randomly spaced about the filter mound.

18. The filter for a cooling air supply hole in a gas turbine component according to claim 15, wherein the gas turbine component and the filter mound are integrally formed during additive manufacturing of the gas turbine component.

19. The filter for a cooling air supply hole in a gas turbine component according to claim 15, further including additional blockage structure in the interior of the filter mound, the additional blockage structure in the interior of the filter mound being configured for at least one of blocking debris from passing through the at least one hole and breaking up or fracturing debris entering through the at least one hole.

20. The filter for a cooling air supply hole in a gas turbine component according to claim 19, wherein additional blockage structure in the interior of the filter mound includes at least one of at least one pedestal on the outer wall of the gas turbine component; at least one circumferential raised ring on the outer wall of the gas turbine component; and an extruded hole extending from the cooling air supply hole on the outer wall of the gas turbine component.

* * * * *